Figure 1:
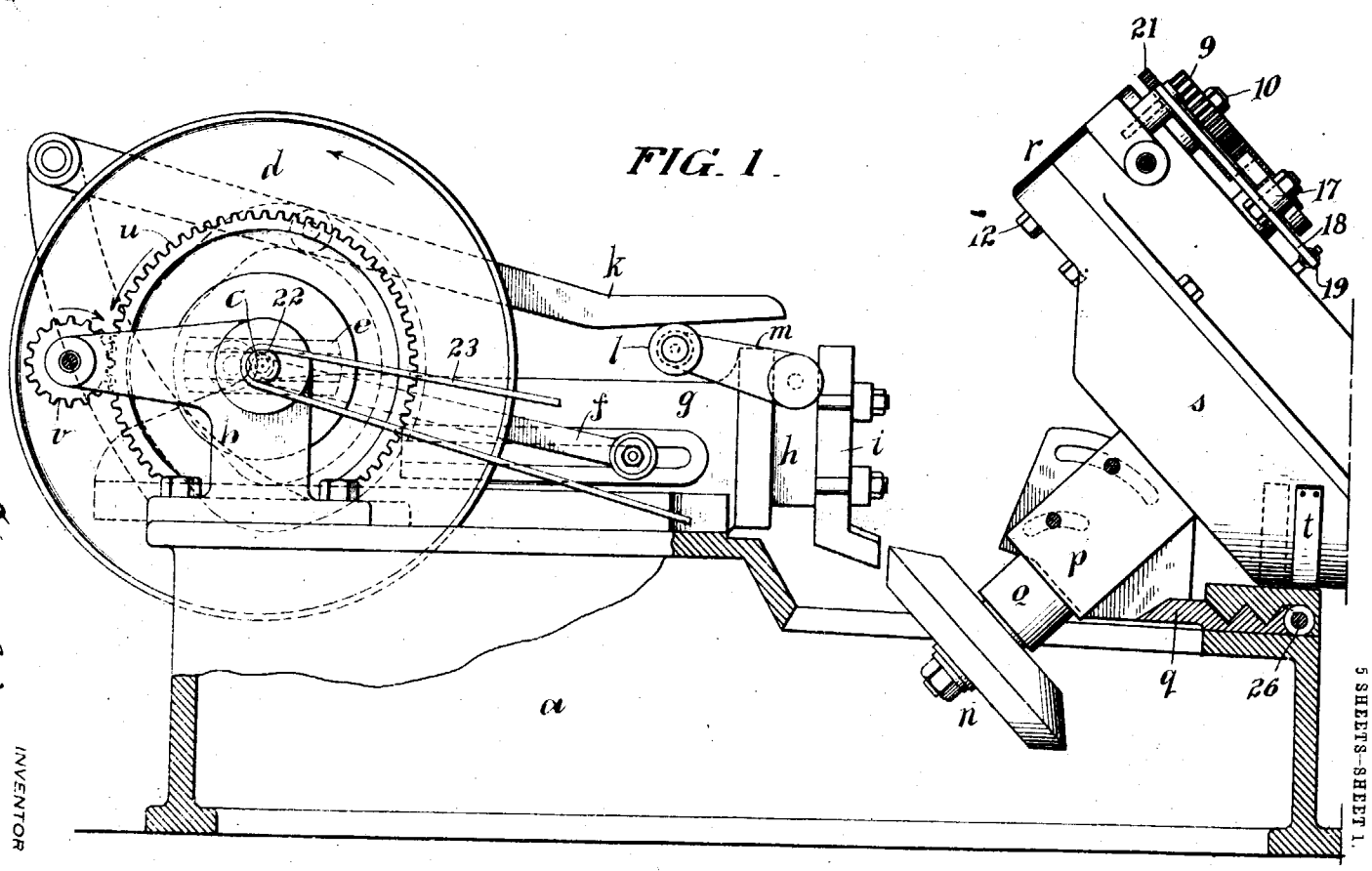

H. BILGRAM.

GEAR CUTTING MACHINE.

APPLICATION FILED SEPT. 26, 1912.

Reissued Dec. 31, 1912.

13,502.

5 SHEETS—SHEET 1.

WITNESSES

Daniel Webster Jr.

J. Thurnt

INVENTOR

Hugo Bilgram

BY Francis T. Chambers his ATTORNEY

H. BILGRAM.

GEAR CUTTING MACHINE.

APPLICATION FILED SEPT. 26, 1912.

Reissued Dec. 31, 1912.

13,502

5 SHEETS—SHEET 2.

WITNESSES

Daniel Webster, Jr.

Otto Munz

INVENTOR

Hugo Bilgram

BY Francis T. Chambers his ATTORNEY

H. BILGRAM.
GEAR CUTTING MACHINE.
APPLICATION FILED SEPT. 26, 1912.
Reissued Dec. 31, 1912.
13,502.
5 SHEETS—SHEET 3.
FIG. 4.
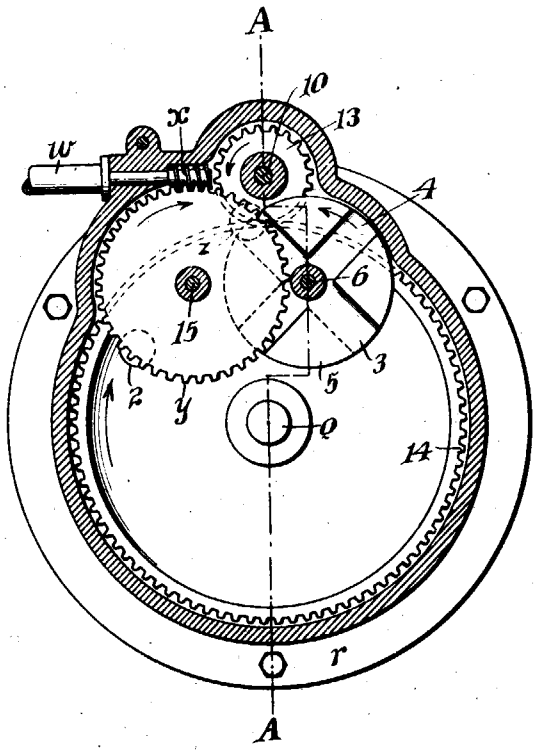
FIG. 3.
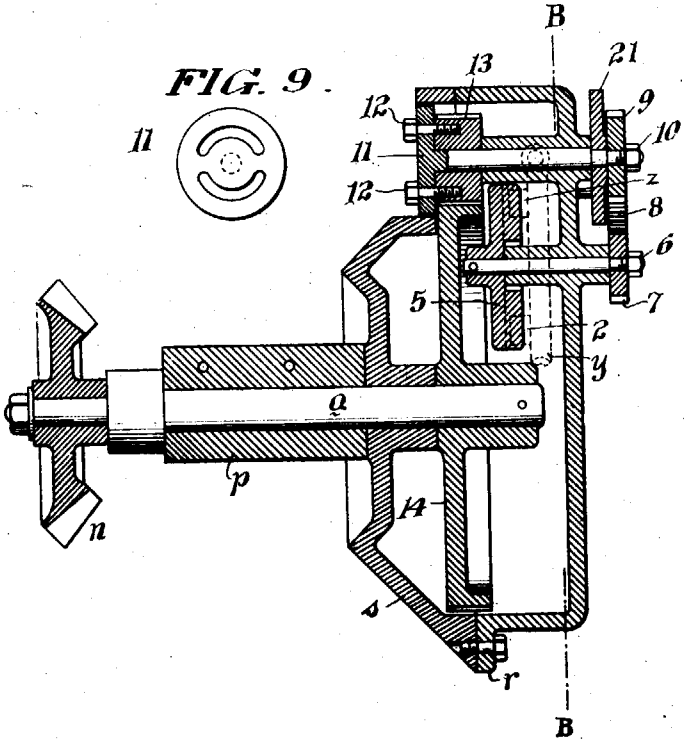
FIG. 9.
WITNESSES
Daniel Webster, Jr.
Stewart
INVENTOR
Hugo Bilgram
BY Francis T. Chamberlin
his ATTORNEY

H. BILGRAM.

GEAR CUTTING MACHINE.

APPLICATION FILED SEPT. 26, 1912.

Reissued Dec. 31, 1912.

13,502.

5 SHEETS—SHEET 4.

WITNESSES

Daniel Webster Jr.

S. Stewart

INVENTOR

Hugo Bilgram

BY Francis T. Chambers

Lis ATTORNEY

H. BILGRAM.
GEAR CUTTING MACHINE.
APPLICATION FILED SEPT. 26, 1912.
Reissued Dec. 31, 1912.
13,502.
5 SHEETS—SHEET 5.
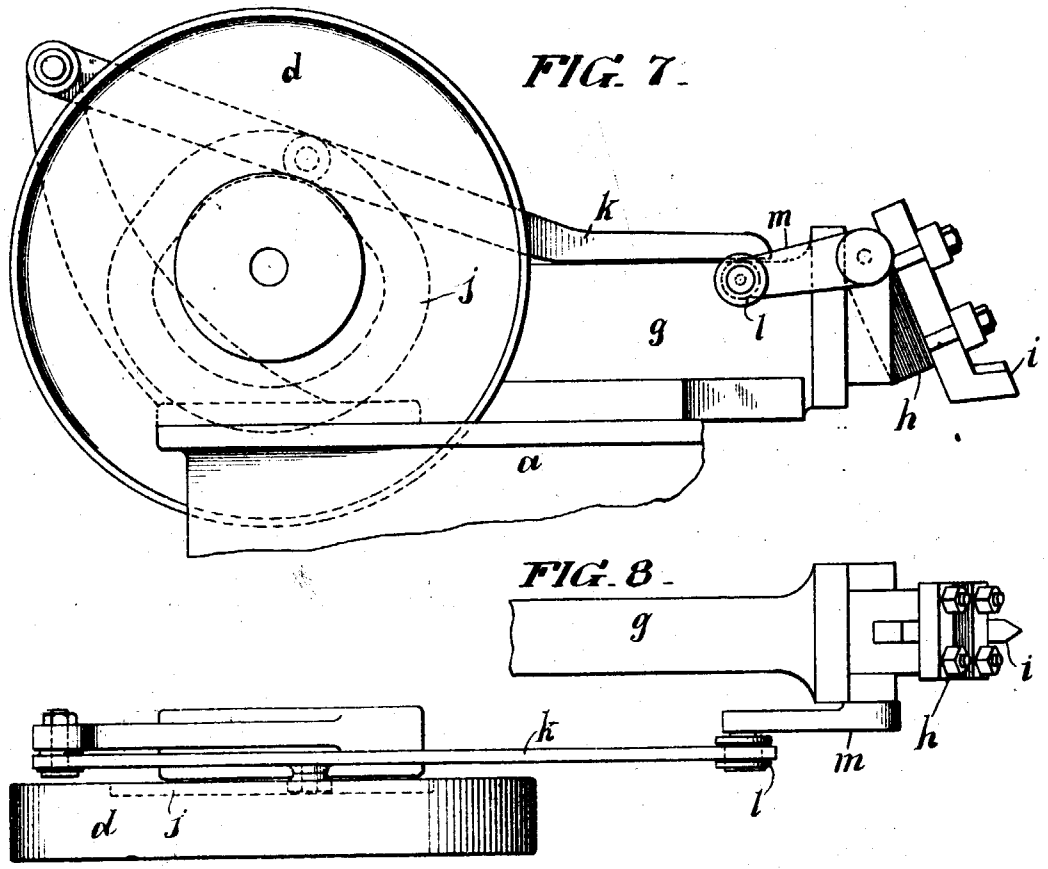
WITNESSES
Daniel Webster Jr.
Otterson
INVENTOR
Hugo Bilgram
BY Francis J. Chambers
Lei ATTORNEY

UNITED STATES PATENT OFFICE.

HUGO BILGRAM, OF PHILADELPHIA, PENNSYLVANIA.

GEAR-CUTTING MACHINE.

13,502. Specification of Reissued Letters Patent. Reissued Dec. 31, 1912.

Original No. 665,054, dated January 1, 1901, Serial No. 21,331. Application for reissue filed September 26, 1912. Serial No. 722,534.

*To all whom it may concern:*

Be it known that I, HUGO BILGRAM, a citizen of the United States of America, residing in the city and county of Philadelphia, in the State of Pennsylvania, have invented a certain new and useful Improvement in Gear-Cutting Machines, of which the following is a true and exact description, reference being had to the accompanying drawings, which form a part thereof.

The object of my invention is to provide improved means for automatically spacing the wheel which is being cut and especially to provide means for automatically spacing the wheel or blank in such machines as, like the machine of my former Patent No. 294,844 of March 11, 1884, have a spacing head or device serving to support the spacing mechanism, which is not stationary but rotatively movable about an axis coincident with that of the arbor. To accomplish this object in my construction the spacing mechanism is attached to the axially rotatable spacing head and is connected to the driving mechanism of the machine by means of a flexible power transmitting connection which permits of the rotative movement of the spacing mechanism upon and with the spacing head, and the spacing mechanism as shown and preferably, is of such construction as to rotate the blank which is being cut through the space of one tooth after every cut of the intermittently operated cutting tool although, of course, any equivalent mode of operation of the spacing mechanism is within my invention.

The drawings show the application of the invention to a machine for cutting bevel gears, shown and described in my Patent No. 294,844, dated March 11, 1884.

Figure 2:
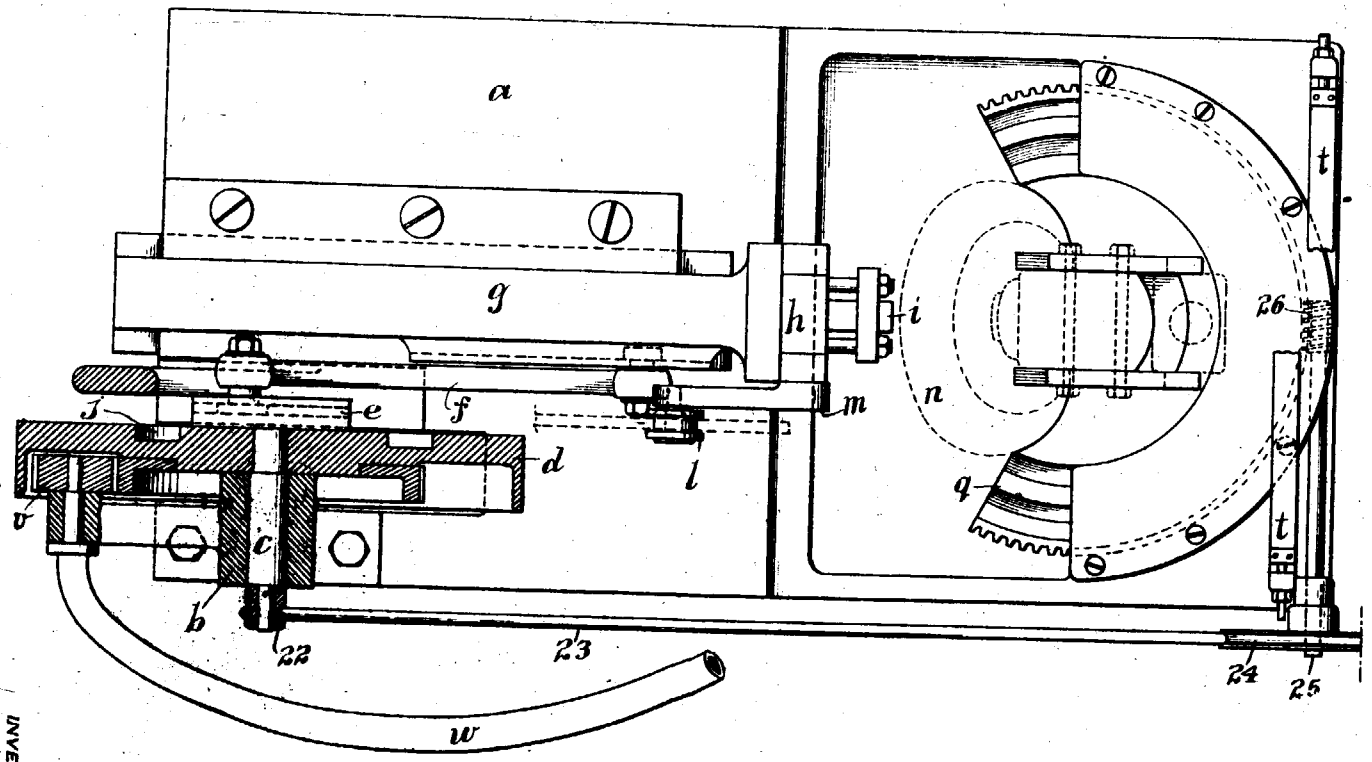
Figure 6:
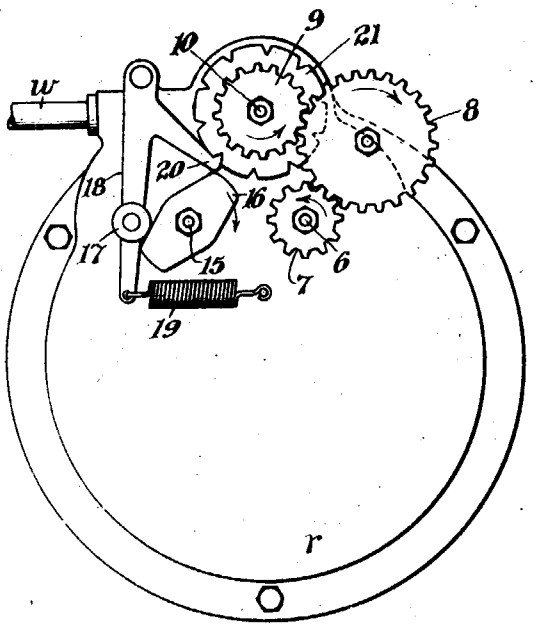
Figure 5:
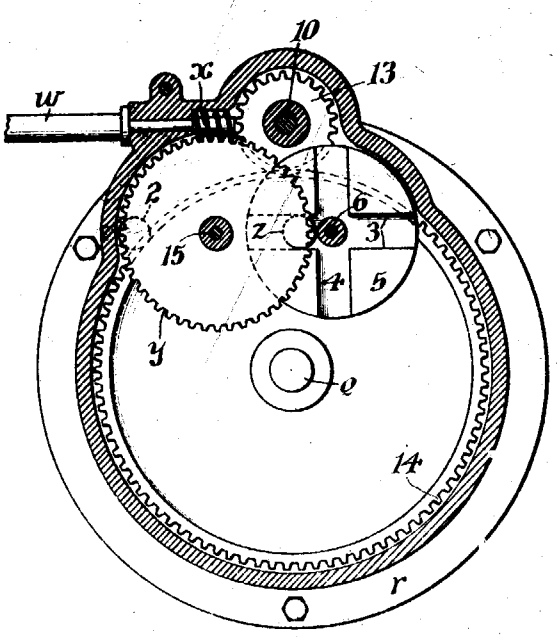

Figure 1 is a front elevation, partly in section, of my machine for cutting the teeth of gear wheels. Fig. 2, is a plan, partly in section, with the blank arbor and spacing head removed, the position of the blank and of the blank arbor bearing being indicated by dotted lines. Fig. 3 is a section through the blank arbor bearing and the spacing head on the broken line A A of Fig. 4. Fig. 4 is a section through the spacing head on line B B of Fig. 3. Fig. 5 is a like section showing the working parts in a different position. Fig. 6 is the top view of the spacing head corresponding to the sections shown in Figs. 4 and 5. Fig. 7 is a portion of the front elevation illustrating the action of the tool lifter. Fig. 8 is a plan of the same portion. Fig. 9 is the end view of the arbor flange 11.

To the body *a* of the machine is secured the bearing *b* of the arbor *c*, which carries the driving pulley *d* and the adjustable crank *e*. By means of the connecting rod *f* this crank is connected with the ram *g*, which carries the apron *h*, to which the tool *i* is secured. As the pulley *d* rotates, the ram *g*, and with it the tool *i*, receives the reciprocating movement requisite to do the cutting. During the return stroke the tool is raised sufficiently to clear the teeth of the blank which is being cut, so as to allow the said blank to be rotated, preferably through the space of one tooth. This may be accomplished as follows: To the pulley *d* is secured the cam *j*, through which the lever *k* receives an oscillatory movement. The front end of this lever when in its depressed position, as shown in Fig. 7, comes in contact with the roller *l*, carried by the lever *m*, which is attached to the apron *h*. By the action of this lever the tool is alternately raised and lowered, as shown in Figs. 1 and 7, the cam *j* being so timed that the tool will be raised during the return stroke and in its normal cutting position during its forward stroke.

The blank *n* is clamped to the arbor *o*, the bearing *p* of which is held in an inclined position on the plate *q*, which is provided with semi-annular ridges, by means of which it is held to the body of the machine, so that it can be oscillated on an approximately vertical axis.

To the upper end of the arbor *o* is rotatably connected the housing *r* of the spacing head, to which is attached the cone *s*, the surface of which is a production of the pitch cone of the blank *n*. By means of two steel bands *t*, *t*, each of which has one end attached to the cone *s* and the other to the body of the machine in such a way that one band prevents the rotation of the said cone in one direction, the other in the other direction, the said cone is held so that when the grooved plate *q* is oscillated it will assume a motion as of a cone rolling on a plane without slip. If the housing *r*, of which the said cone *s* is a part, were coupled to the blank arbor *o*, this rolling motion would be transmitted to the blank *n*, thereby imparting to it that motion which is necessary to cause the tool to generate the proper tooth curve.

As a matter of fact the housing *r* is only intermittently coupled to the arbor *o*—namely, during the forward stroke of the tool. During the return stroke of the tool the blank arbor is rotated in relation to the husing *r* through the distance, preferably, of one tooth of the blank *n*. This intermittent rotation is accomplished as follows: The driving pulley *d* carries the gear wheel *u*, which engages with the pinion *v*. This pinion is coupled to one end of the flexible shaft *w*, to the other end of which is secured the worm *x*, engaging with the worm wheel *y*, which is shown in Figs. 4 and 5 in full and in Fig. 3 in dotted lines. The ratio of gearing is such that the flexible shaft will attain a comparatively high speed and that the worm wheel *y* will make one half of a revolution for every full revolution of the driving pulley *d*. The face of the worm wheel is provided with two rollers *z* and 2, which engage with two grooves 3 and 4, planed at right angles into the face of the wheel 5. When the worm wheel *y* is in position, (shown in Fig. 4,) the roller *z* enters the groove 3 and imparts to the wheel 5 a rotary movement of an accelerating nature. After the worm wheel has completed one eighth of a rotation, assuming the position shown in Fig. 5, it will have imparted to the wheel 5 one-eighth of a revolution, and the rate of motion of the wheel 5 will have reached its maximum. As the worm wheel *y* completes another one-eighth of a revolution, the movement imparted to the wheel 5 will be of a retarding nature, and the groove 3 of the wheel 5 will arrive at the position which the groove 4 assumes in Fig. 4, the roller *z* leaving the groove. During the next quarter turn of the worm wheel *y* the wheel 5 will remain stationary until the first semi-revolution of the worm wheel has been completed and the rollers *z* and 2 have exchanged their positions. The roller 2 will then enter the groove 4, which will then be in the position occupied by the roller *z* and the groove 3 of Fig. 4, and the process described will be repeated. In this way an intermittent motion is imparted to the wheel 5, which is so timed that a one-quarter rotation occurs during the return stroke of the tool, while the wheel remains at rest during the forward stroke. The wheel 5 is secured to the arbor 6, to which is clamped the change wheel 7. This is geared through the idler 8 to the change-wheel 9, which is clamped to the arbor 10. This arbor carries a flange 11, provided with slots. (Shown in Fig. 9.) By means of the bolts 12 which pass through the said slots, the spacing pinion 13 is adjustably secured to the arbor 10. This pinion engages with the master wheel 14, which is secured to the blank arbor *o*. The train of gears just described connects the grooved wheel 5 with the blank arbor *o*. The change gears are so selected that for each quarter revolution of the wheel 5 the blank *n* is rotated through the space of one tooth.

For holding the blank firmly during the forward stroke of the tool an anchor is provided as follows: To the arbor 15 of the worm wheel *y* is secured cam 16, Fig. 6, which engages with the cam roller 17 of the anchor lever 18, the spring 19 holding the roller in contact with the cam. The lever 18 carries the anchor toe 20, engaging with the notched anchor wheel 21, which is clamped to the pinion arbor 10. The cam 16 is so timed that the wheel 21 will be anchored during the forward stroke of the tool and released during the return stroke.

The feeding is accomplished in the following manner: The pulley arbor *c* carries the belt pulley 22, Figs. 1 and 2, which is connected by belt 23 with the belt pulley 24. This pulley is secured to the shaft 25, the end of which carries the worm 26, which engages with teeth cut into the rim of the plate *q*, by means of which the requisite rolling motion is transmitted to the blank.

It will be noted that what I have called the spacing head is journaled concentric with the arbor which rotates axially in relation to it during the operation of the spacing mechanism and axially with it to effect the angular adjustment of the work to the cutting tool necessary for the correct feeding of the blank to the tool; and that the spacing mechanism supported on the spacing head shares its movements, but owing to the power transmitting mechanism connecting it with the motive power being flexible it is not affected in its operation by such movement.

The operation of the machine may be described as follows: When the pulley *d* is put in motion, a reciprocating cutting movement is transmitted to the tool *i*, as hereinbefore described. During its return stroke the tool is raised to clear the teeth of the blank which is being cut, as described. Before starting the machine the blank is rolled so far to one side that the tool will make only a light cut into the circumference of the blank. By the spacing mechanism described the blank is rotated during each return stroke of the tool through the distance of one tooth, so that the tool at each consecutive stroke will make a cut into that part of the blank into which the next adjoining tooth is to be cut. At the same time the feeding movement progresses slowly, so that each following cut will be slightly deeper than the one preceding and that after the blank has made one revolution and the tool has plowed the first cut into each space of the blank the tool will make a second cut into the first space somewhat deeper than the first cut. This process will continue until the rolling motion of the blank has proceeded so far that the tool ceases to cut.

In order to obtain the convergent space peculiar to bevel gearing, both the tool and the blank are readjusted for a second operation similar to that described, the first operation having correctly generated only one side of each tooth space of the blank. The readjustment of the tool may be accomplished by a reclamping, while the readjustment of the blank may be effected by loosening the bolts 12, slightly turning the pinion 13 on its arbor 10, and reclamping the bolts.

The described machine presents only one modification of my invention and may be varied in details without departing from its spirit. It may be as well applied to machines for cutting spur and spiral wheels.

I claim as new:

1. In a machine for cutting gear wheels, in combination, a tool adapted to cut intermittently, an arbor adapted to hold the blank to be cut, a spacing head rotatively movable about an axis coincident with that of the arbor, spacing mechanism supported on the rotatively movable spacing head, said mechanism being intermittently active and operative during a non-cutting portion of the movement of the intermittently cutting tool, means for transmitting the intermittent motion of the spacing mechanism to the blank arbor, a flexible connection adapted to transmit motion from the driving pulley of the machine to the spacing mechanism, an anchor adapted to lock the blank arbor in position in its rotatable spacing head during the intervals between the intermittent movements of the spacing mechanisms, and feeding mechanism controlling the relative positions of the tool and the blank to be cut and acting to give a rotating movement to the spacing head about the axis of the arbor and through it to the arbor and blank.

2. In a machine for cutting gear wheels, in combination, a tool, means for imparting to the said tool a reciprocating cutting movement, means for lifting the tool during its return stroke, clear of the teeth of the wheel being cut, an arbor adapted to hold the blank to be cut, a spacing head rotatively movable about an axis coincident with that of the arbor, spacing mechanism supported on the rotatively movable spacing head, said mechanism being intermittently active and operative during a non-cutting portion of the movement of the intermittently cutting tool, means for transmitting the intermittent motion of the spacing mechanism to the blank arbor, a flexible connection adapted to transmit motion from the driving pulley of the machine to the spacing mechanism, an achor adapted to lock the blank arbor in position in its rotatable spacing head during the intervals between the said intermittent movements, and a feeding mechanism controlling the relative position of the tool and the blank to be cut and acting to give a rotating movement to the spacing head about the axis of the arbor and through it to the arbor and blank.

3. In a machine for cutting gear wheels, in combination, a tool adapted to cut intermittently, a blank arbor adapted to hold the blank to be cut, a wheel carrying on its face two rollers, said rollers, means for imparting to said wheel a rotary motion so timed that the wheel will make one half revolution for every complete stroke of the tool, a wheel, provided on its face with two grooves, so located as to engage with the aforesaid rollers for the purpose of deriving an intermittent movement from the continuous movement, means for transmitting said intermittent movement to said blank arbor, an anchor adapted to lock said blank arbor in position during the intervals between said intermittent movements, and a feeding mechanism controlling the relative position of the tool and the blank to be cut.

4. In a machine for cutting gear wheels, in combination, a tool, means for imparting to the said tool a reciprocating cutting movement, means for lifting the said tool during its return stroke clear of the teeth of the blank in process of cutting, a blank arbor adapted to hold the blank to be cut, a wheel, carrying on its face two rollers, a flexible connection adapted to transmit motion from the driving pulley to the said wheel so timed that the wheel will make one half revolution for every complete stroke of the tool, a wheel, provided on its face with two grooves, so located as to engage with the aforesaid rollers for the purpose of deriving an intermittent movement from the continuous movement, means for transmitting said intermittent movement to said blank-arbor, an anchor adapted to lock said blank arbor in position during the intervals between said intermittent movements, and a feeding mechanism controlling the relative position of the tool and the blank to be cut.

HUGO BILGRAM.

Witnesses:
ARNOLD KATZ,
D. STEWART.

DISCLAIMER.

13,502. (Reissue).—*Hugo Bilgram*, Philadelphia, Pa. GEAR-CUTTING MACHINE.

Patent dated December 31, 1912. Disclaimer filed June 21, 1913, by the patentee.

Enters this disclaimer—

"As to the subject-matter of claims 1 and 2 of said patent the employment of any spacing mechanism supported on the rotatively movable spacing head which does not comprise and include as a part thereof means or mechanism for converting the uniform motion of the driving pulley transmitted through the flexible connection into intermittent motion." [*Official Gazette, July 1, 1913.*]